United States Patent [19]

Bald

[11] 4,184,669
[45] Jan. 22, 1980

[54] OPERATION ON WORKPIECES

[76] Inventor: Hubert Bald, 26 Dörnenstrasse, 5820 Gevelsberg, Fed. Rep. of Germany

[21] Appl. No.: 862,806

[22] Filed: Dec. 21, 1977

[51] Int. Cl.² .............................................. B23Q 3/00
[52] U.S. Cl. ................................................... 269/309
[58] Field of Search .................... 269/321 A, 309–314, 269/20, 289 R; 403/13; 29/464

[56] References Cited

U.S. PATENT DOCUMENTS 3,606,300 9/1971 Davis .................................. 269/309
4,058,885 11/1977 Bergman ............................. 269/20

Primary Examiner—Robert C. Watson

Attorney, Agent, or Firm—Sughrue, Rothwell, Mion, Zinn and Macpeak

[57] ABSTRACT

A method of performing an operation on a workpiece comprising the preparatory steps of simultaneously positioning and clamping a workpiece by a bearing surface thereof onto a receiving surface of a clamping body with the aid of complementary positioning devices provided in the bearing surface and receiving surface and which enable the workpiece and the clamping body to be clamped together. The clamping body has, at a predetermined position relative to its positioning devices, reference features which are detectable by measurement techniques. At least one co-ordinate measure of a reference co-ordinate system is definable in the plane of the receiving and is derivable from the positioning devices.

20 Claims, 12 Drawing Figures

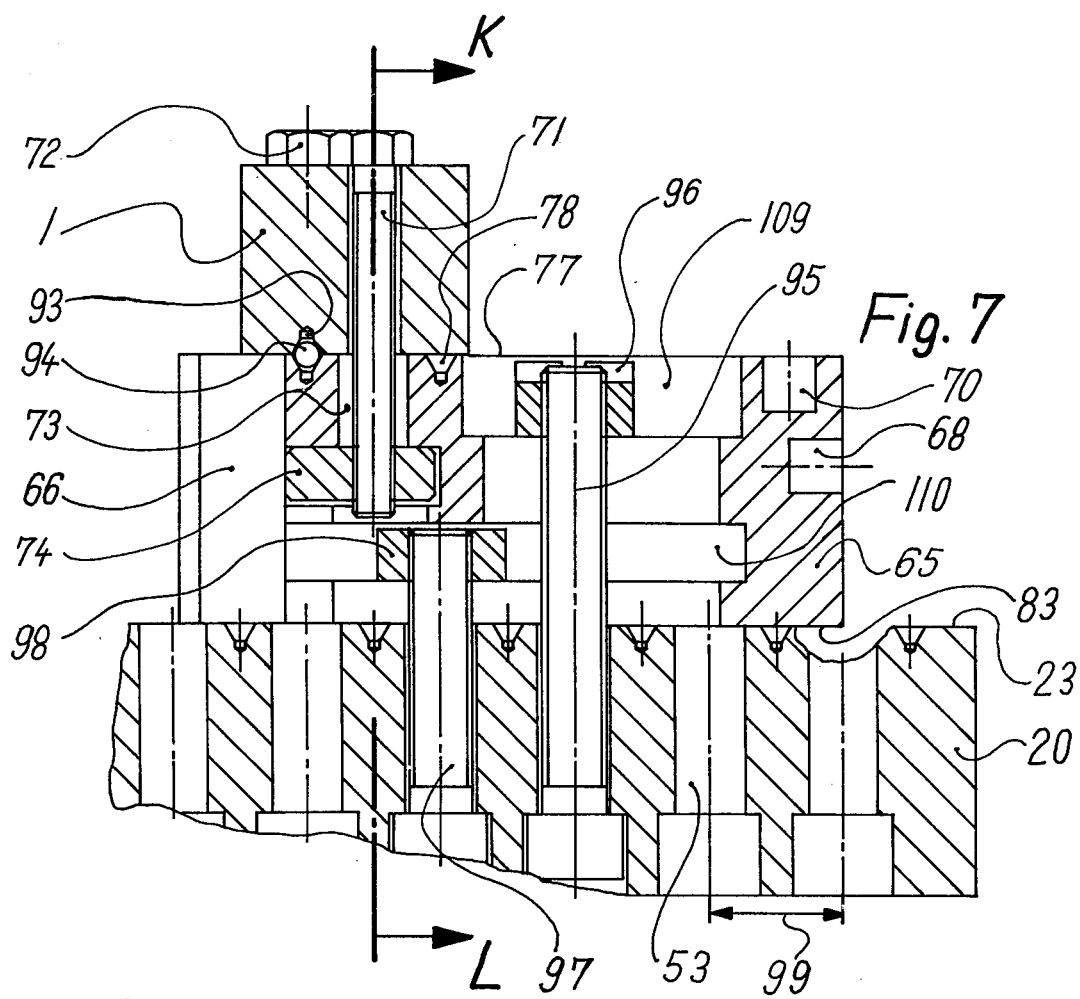

OPERATION ON WORKPIECES

BACKGROUND OF THE INVENTION

The present invention relates to a method of performing an operation on a workpiece and to a clamping body for use in performing an operation on a workpiece. Such an operation includes inspecting the workpiece and machining the workpiece.

In U.S. Pat. No. 4,070,120 there is disclosed a method of connecting two components with one another at their joint faces by an arrangement of positioning recesses and positioning elements in which the relative position of both components is defined in an exact predeterminable manner. This positioning accuracy is maintained even if the components are detached from one another and reconnected several times.

These and further advantages reside in the configuration of the positioning recesses, which converge in cross-section from the joint face, and on the converging configuration of the positioning elements, which thereby centre themselves within the positioning recesses. Also the material portions disposed in the neighbourhood of the relatively small contact region between positioning recess and positioning element are deformed in a controlled manner during the clamping together of the components.

The production, inspection and assembly of workpieces especially in the production of single parts and small batches is facilitated by preferably using the positioning means disclosed in the said patent.

A workpiece to be clamped-up in its turn is provided with corresponding positioning recesses, whereby the workpiece is positioned on a receiving surface of a clamping body by using associated positioning means. Production or inspection dimensions of the workpiece are then referred from the construction to a reference co-ordinate system which can be defined by the joint face and by the centre lines of at least two positioning means of the workpiece, which lie in the joint face.

If it is desired to undertake a machining operation or a measurement on the workpiece while using such a clamping body, then the difficulty arises that the positioning recesses serving as reference features are no longer detectable by measurement technique, since they were introduced from the joint face of the workpiece and are therefore no longer accessible after jointing.

SUMMARY OF THE INVENTION

According to one aspect of the present invention there is provided a clamping body for use in the performance of an operation on a workpiece and comprising a receiving surface to receive a workpiece, at least two special positioning recesses at said receiving surface of said clamping body, said special positioning recesses each having a cross-section which narrows in a direction away from said receiving surface and being adapted to receive a positioning element for the use of positioning said workpiece free of play, and reference means disposed at a precise predetermined position relative to a three-dimensional rectangular reference co-ordinate system defined by said at least two special positioning recesses in the plane of said receiving surface and being detectable by measurement means even if the whole of said receiving surface is covered by said workpiece, wherein at least one precise measure of said predetermined position extending in parallel with one axis of said rectangular reference co-ordinate system is derivable from said reference means.

According to another aspect of the present invention there is provided a clamping body provided with a workpiece for use in the performance of an operation on said workpiece and comprising a receiving surface to receive a workpiece, positioning means comprising at least two special positioning recesses at at least said receiving surface of said clamping body, and reference means disposed at a predetermined position relative to a three-dimensional rectangular reference co-ordinate system defined by said at least two special positioning recesses in the plane of said receiving surface and being detectable by measurement means, wherein at least one measure of said predetermined position extending parallel with one axis of said rectangular reference co-ordinate system is derivable from said reference means, and wherein each of said at least two special positioning recesses has a substantially conical wall surface portion disposed symmetrically with respect to an axis of symmetry extending substantially perpendicularly of said receiving surface and passing through said special positioning recess, said workpiece being provided with a positioning element having a free end portion thereof extending outwardly from a bearing surface of said workpiece and adapted to be introduced into said special positioning recess in said clamping body, said free end portion of said positioning element having a substantially spherical centering portion of reducing cross-section towards an outer extremity of said free end portion and having an axis of symmetry alignable with said first mentioned axis of symmetry, whereby—on said clamping body and said workpiece being urged towards one another to cause said positioning element to enter said special positioning recess in said clamping body—said receiving surface of said clamping body and said bearing surface of said workpiece are brought into mutually abutting relationship to define an interface between said clamping body and said workpiece whilst only said substantially spherical centering portion of said positioning element is brought to engage against said substantially conical wall surface portion of said special positioning recess, said substantially conical wall surface portion being tapered to include at said axis an angle smaller than that subtended thereat by any two notional tangents to said substantially spherical centering portion at points thereon disposed symmetrically relative to said axis and inwardly of said engaging surfaces, said conical wall surface portion extending outwardly from said engaging surfaces to be spaced apart from the surface portion of said positioning element facing said conical wall surface portion, said substantially spherical centering portion being brought to engage with sufficient force to cause material deformation of at least one of said substantially conical wall surface portion and said substantially spherical centering portion thereby to enlarge at least one of said engaging surfaces and to positively locate said positioning element in said special positioning recess free of play.

According to a further aspect of the present invention there is provided a clamping body provided with a workpiece for use in the performance of an operation on said workpiece and comprising a receiving surface to receive a workpiece, positioning means comprising at least two special positioning recesses at at least said receiving surface of said clamping body, and reference means disposed at a predetermined position relative to a three-dimensional rectangular reference co-ordinate system defined by said at least two special positioning recesses in the plane of said receiving surface and being detectable by measurement means, wherein at least one measure of said predetermined position extending in parallel with one axis of said rectangular reference co-ordinate system is derivable from said reference means, and wherein said workpiece has a bearing surface and is provided with positioning means at at least said bearing surface, said positioning means comprising further recesses each having a substantially conical wall surface portion diposed symmetrically with respect to an axis of symmetry extending substantially perpendicularly of said bearing surface and passing through said further recess, said substantially conical wall surface portion being of increasing cross-section towards said bearing surface, said clamping body being providedd with a positioning element located in said special positioning recess and having a free end portion thereof extending outwardly from said receiving surface of said clamping body and adapted to be introduced into said further recess in said workpiece, said free end portion of said positioning element having a substantially spherical centering portion of reducing cross-section towards an outer extremity of said free end portion and having an axis of symmetry alignable with said first mentioned axis of symmetry, whereby on said clamping body and said workpiece being urged towards one another to cause said positioning element to enter said further recess in said workpiece, said receiving surface of said clamping body and said bearing surface of said workpiece are brought into mutually abutting relationship to define an interface between said receiving surface and said bearing surface whilst only said substantially spherical centering portion of said positioning element is brought to engage against said substantially conical wall surface portion of said further recess, said substantially conical wall surface portion being tapered to include at said axis an angle smaller than that subtended thereat by any two notional tangents to said substantially spherical centering portion at points thereon disposed symmetrically relative to said axis and inwardly of said engaging surface, said conical wall surface portion extending outwardly from said engaging surfaces to be spaced apart from the surface portion of said positioning element facing said conical wall surface portion, said substantially spherical centering portion being brought to engage with sufficient force to cause material deformation of at least one of said substantially conical wall surface portion and said substantially spherical centering portion thereby to enlarge at least one of said engaging surfaces and to positively locate said positioning element in said further recess free of play.

The position of the reference means with respect to the positioning means of the receiving surface is given in the production of the clamping body and is thus known.

Such reference means can be surfaces, bores, graticules and/or additional positioning devices, e.g. positioning recesses, which remain accessible after the connection of the clamping body with the workpiece. It can also be expedient to provide several such reference means on the clamping body.

The clamping body may be positioned on a machine table or on another clamping body with the aid of positioning means preferably disclosed in said patent.

In this manner a system of positioning means may be constructed which has the additional advantage of appreciably shortening the clamping and other setting-up times in the production of single workpieces and small batches, since a multiplicity of measuring and alignment operations can be dispensed with by the attainable predetermined position of the clamping body relative to the axes of movement and the measuring system of the production machine. Nevertheless, a production with high accuracy is made possible.

Advantages of the present invention are explained when one sets out in a known manner to process a workpiece having two positioning devices disclosed in said patent. This explanation can take place by reference to FIGS. 1 and 2 of the drawings accompanying the present specification, wherein two conical recesses represent positioning recesses of the positioning means with the aid of which the positioning of the workpiece is to take place during the later final assembly. At least those dimensions which are important in the performance of the actual function of the workpiece (after completed final assembly), must be referred to a reference co-ordinate system which is defined by the later joint face (in which the conical recesses are provided) and the centre lines of the two conical recesses. It is preferable to refer all workpiece dimensions to this reference co-ordinate system. In the case of the workpiece according to the FIGS. 1 and 2, the zero point of the rectangular reference co-ordinate system $X1, Y1$, and $Z1$ is defined by that point, at which the centre lines of the left-hand positioning bore penetrates the plane of the workpiece surface. The position of the reference co-ordinate system, the co-ordinate axes $X1$ and $Y1$ of which lie in the plane of the workpiece surface, is unambiguously determined relative to the workpiece by the co-ordinate of the second positioning bore. The production task may amongst other things consist in producing the cylindrical bores in respect of the spatial position of their centre lines with high accuracy in relation to the reference co-ordinate system. Coarse tolerances shall be permitted for the position of the surfaces or for the position of the edges formed by them, since they play no part in the function of the workpiece.

A correspondingly good surface quality and evenness of surface is prescribed for the surface carrying the conical bores and serving as clamping surface and reference surface. In the case of the production of a single workpiece, no special production means recommends itself. In the production of the exact co-ordinate measures for the cylindrical bores relative to the reference co-ordinate system, two auxiliary surfaces are still needed in addition to the clamping surface and reference surface to be produced in any case in a known production method. These two auxiliary surfaces in the case of the workpiece shown in FIGS. 1 and 2 are perpendicular to one another and to the reference surface and must be produced with narrow tolerances so that from them in their turn, the co-ordinate measures of all bores can be derived. One therefore starts expediently with the production of these three surfaces. In the following production of the bores, one must clamp the workpiece in four different spatial positions on a suitable clamping support. One must each time align the workpiece anew over its reference surface and its two auxiliary surfaces parallel to the axes of the machine tool and produce a reference between the three surfaces and the measuring system of the machine tool.

For the sequence of the individual working steps, no particular rules let themselves be set up, but they are known to the expert.

Jigs come into consideration when mass production is involved. For the purpose of producing the bores, the workpiece must be aligned within the jig likewise again through the reference surface and two auxiliary surfaces. No particular demands are made in this case on the auxiliary surfaces. The demanded high accuracy must be ensured by the features of the jig, for example by the accuracy of drill-jig bushes fastened to the jig.

The disadvantage of a conventional jig intended for mass production are, as is known, the relatively high manufacturing costs and use of the jig, which as a rule can be used for only one type of workpiece.

The particular disadvantages in a known production of single pieces or small batches of the workpiece shown in FIGS. 1 and 2 are as follows:

(1) One must produce two auxiliary surfaces with high accuracy as reference surfaces, although this accuracy (as also the entire auxiliary surface) is not required for the function of the workpiece.

(2) One must on each new clamping-up of the workpiece align it with the reference surfaces parallel to the axes of the machine tool.

(3) One must on each new clamping-up of the workpiece align the measuring system of the machine tool anew relative to the reference surfaces.

(4) Additional inaccuracies result from the auxiliary surfaces in their turn having tolerances, for example that they are not at a right angle to the other surfaces.

(5) Additional inaccuracies result from the unnecessary measuring chain which must be formed by virtue of the detour by way of the auxiliary surfaces.

The aforementioned disadvantages are in part completely avoided and in part substantially reduced by the present invention.

The advantages to be attained by the present invention are not restricted only to such workpieces as correspond to that shown in FIGS. 1 and 2 example, but are generally applicable.

Apart from the positioning means disclosed in said patent, still other, similarly effective positioning means of differing structure can be used. However, they should preferably have the following characteristic features as are also inherent in the positioning means disclosed in said patent:

1. The positioning means should at the two parts (for example workpiece and the clamping body) to be connected respectively have a positioning recess and a positioning element enclosable between the two positioning recesses. (In some circumstances, the positioning elements can remain arranged fast in the positioning recesses of the clamping bodies).

2. Positioning forces, which are directed parallel to the receiving surface (or combination surface) and necessary for the attainment of the final position, should be capable of being derived from the actual clamping forces directed perpendicularly to the receiving surface (or combination surface). In other words the positioning means act self-centringly under the action of a clamping force directed in the direction of the main axis of the centring means.

For the attainment of the self-centring action, the structure of positioning recess and positioning element, at least insofar as it concerns the positioning recess in the workpiece, should preferably be of such a kind that the positioning recess narrows in cross-section from the clamping surface and that the positioning element likewise, at least in the region of the contact with the positioning recess, narrows in cross-section towards the interior of the positioning recess.

BRIEF DESCRIPTION OF THE DRAWINGS

Embodiments of the present invention will now be more particularly described by way of example and with reference to the accompanying drawings in which:

FIG. 3 shows a plan view of a clamping body with a workpiece clamped-on,

FIG. 7 shows a section along line E F of FIG. 6.

DESCRIPTION OF THE PREFERRED EMBODIMENTS

Figure 2:
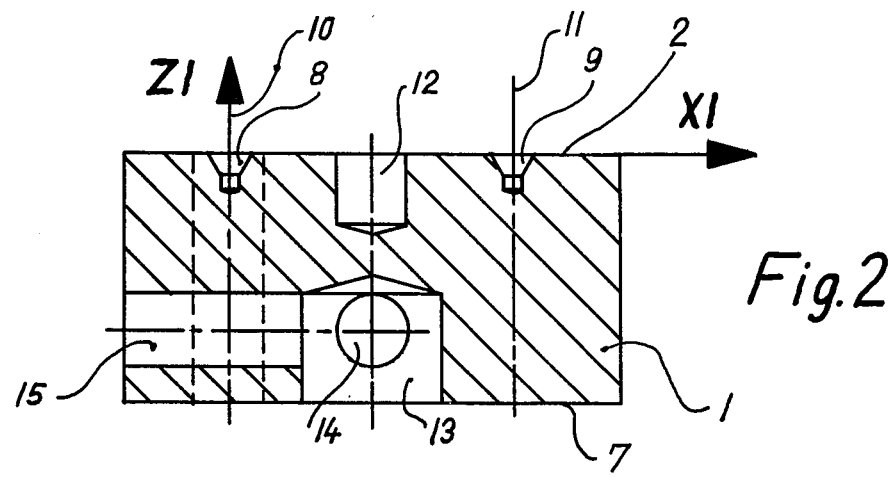
FIG. 2 shows a section along lines N O P Q of FIG. 1.
Figure 1:
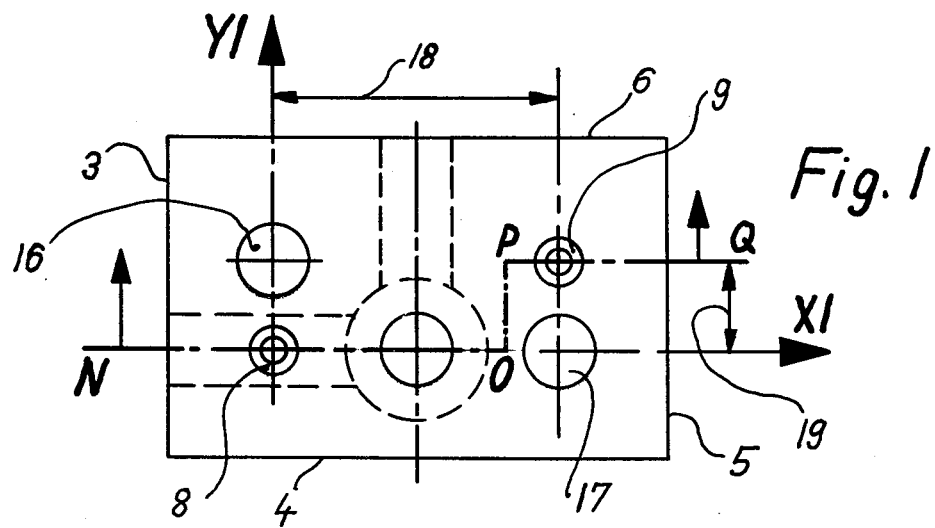
FIG. 1 shows a workpiece to be clamped-up.
Figure 12:
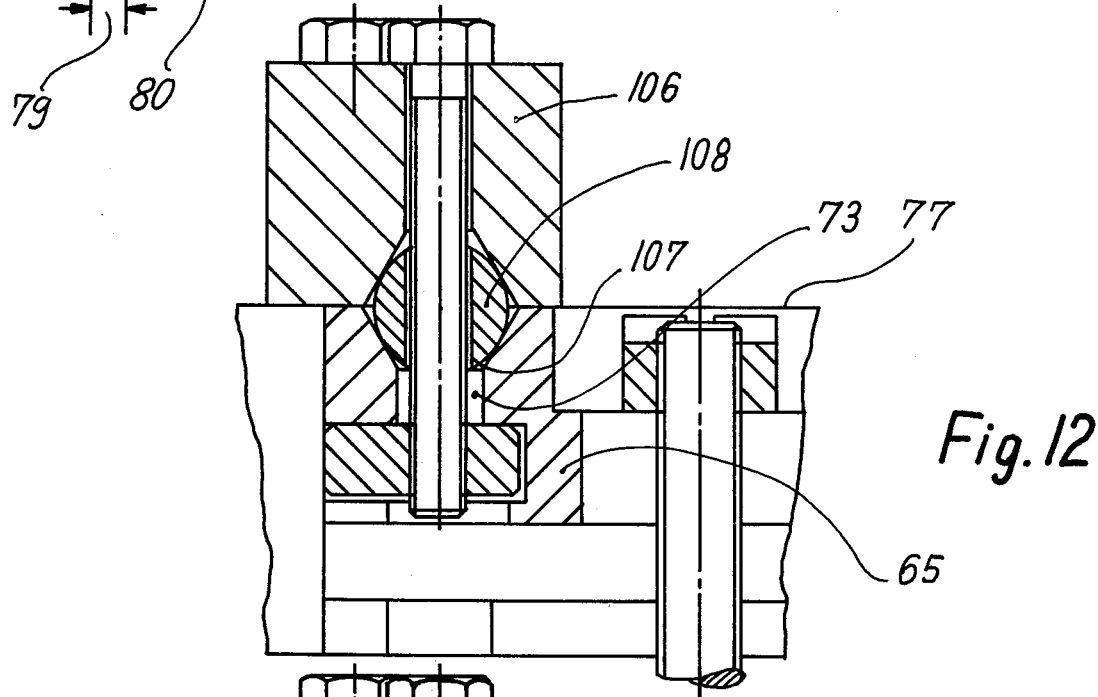
FIG. 12 shows another modification of the section along lines E F of FIG. 6.

Referring now to the drawings, FIGS. 1 and 2 show a workpiece 1. The dimensions to be adhered to in the production of the workpiece 1 relate to a rectangular reference co-ordinate system X1, Y1 and Z1, wherein the co-ordinates X1 and Y1 lie in the plane of the surface 2 and the Z1 co-ordinate co-incides with the centre line 10 of a positioning recess 8. By the positioning recess 8 and by a positioning recess 9, which is dimensionally defined by co-ordinates 18 and 19, the workpiece can be positioned in a predetermined position relative to another component or clamping body during a process in which its surface 2 is clamped against the clamping body. It is presupposed that the clamping body (not shown) likewise has two positioning recesses at a corresponding face, which together with the positioning recesses of the workpiece 1 and with the aid of a respective positioning element can form positioning means as for example disclosed in said patent. Instead of the two shown positioning recesses 8 and 9, more positioning recesses can be provided. Only one positioning recess is required when a further feature is given for the alignment of the workpiece during the jointing process or when the central positioning of a rotationally symmetrical workpiece is concerned. The positioning recess is preferably a conical bore and the positioning element a sphere as shown in FIGS. 1 to 10, but other shapes may be suitable, as shown in FIGS. 11 and 12.

The clamping together of a workpiece or a component and the clamping body by the use of the positioning recesses 8 and 9 for the purpose of the alignment or positioning of the workpiece 1 may be undertaken for several purposes.

A workpiece may be clamped to the clamping body in order to fulfil its final function (for example, assembly of a machine ready for use) or a component can be clamped to the clamping body so as to facilitate an operation on a workpiece (for example, assembly with the component of a production jig). The workpiece 1 has surfaces 3, 4, 5, 6 and 7 which have a subordinate function in respect of their dimensional determination. However, narrow tolerances are expected of the bores 12, 13, 14 and 15 in respect of the measurements of their centre lines to the reference co-ordinate system X1, Y1 and Z1. The bores 16 and 17 (possibly provided with threads) serve to accommodate fastening means which fasten the workpiece 1 to another component or clamping body.

The co-ordinate measurements of the centre line of the positioning recess 9 and the bores 16 and 17, which accommodate the fastening means relative to the reference co-ordinate system X1, Y1 and Z1 are preferably standard dimensions which represent an integral multiple of a basic dimension. This basic dimension can, for example, be 1.25 millimeters. The co-ordinate origin of the reference co-ordinate system X1, Y1 and Z1 does not necessarily have to lie in the centre of a positioning recess of the surface 2, but may be wherever desired. Also, not all measurements of the workpiece 1 have to relate to the reference co-ordinate system X1, Y1 and Z1, but may relate to other (not shown) reference co-ordinate systems which, however, are determined in their spatial position relative to the reference co-ordinate system X1, Y1 and Z1. Before clamping the workpiece 1 to the clamping body the positioning recesses 8 and 9 as well as the surface 2 receiving these positioning recesses must be present. This can be done by, for example, an earlier machining operation on the workpiece 1. Should the bores 16 and 17 also be needed for clamping the workpiece 1 onto the clamping body, they must likewise be present before the clamping-up operation.

Figure 4:
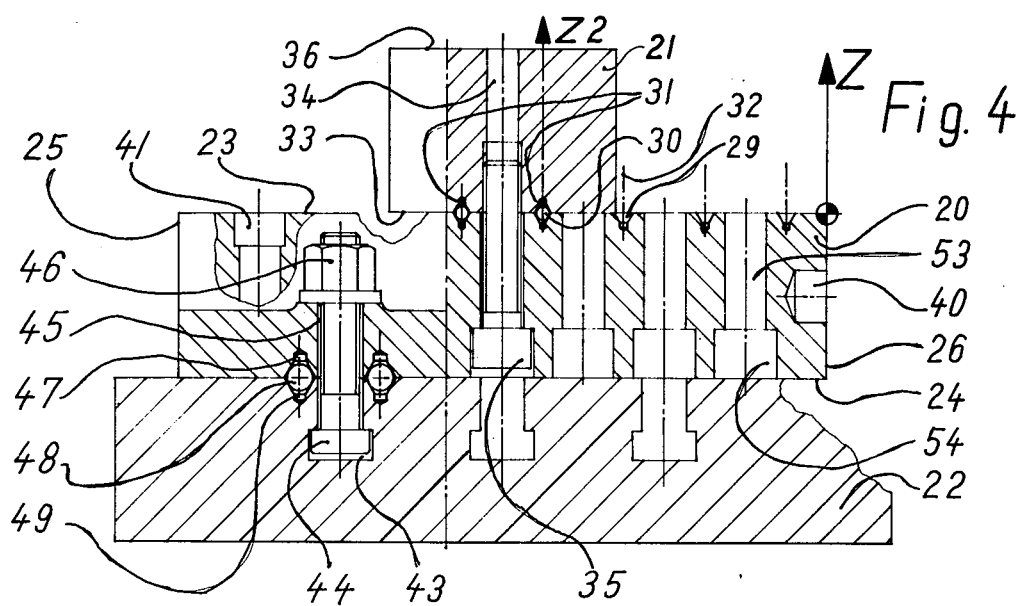
FIG. 4 shows a section along lines A B C D of FIG. 3.
Figure 3:
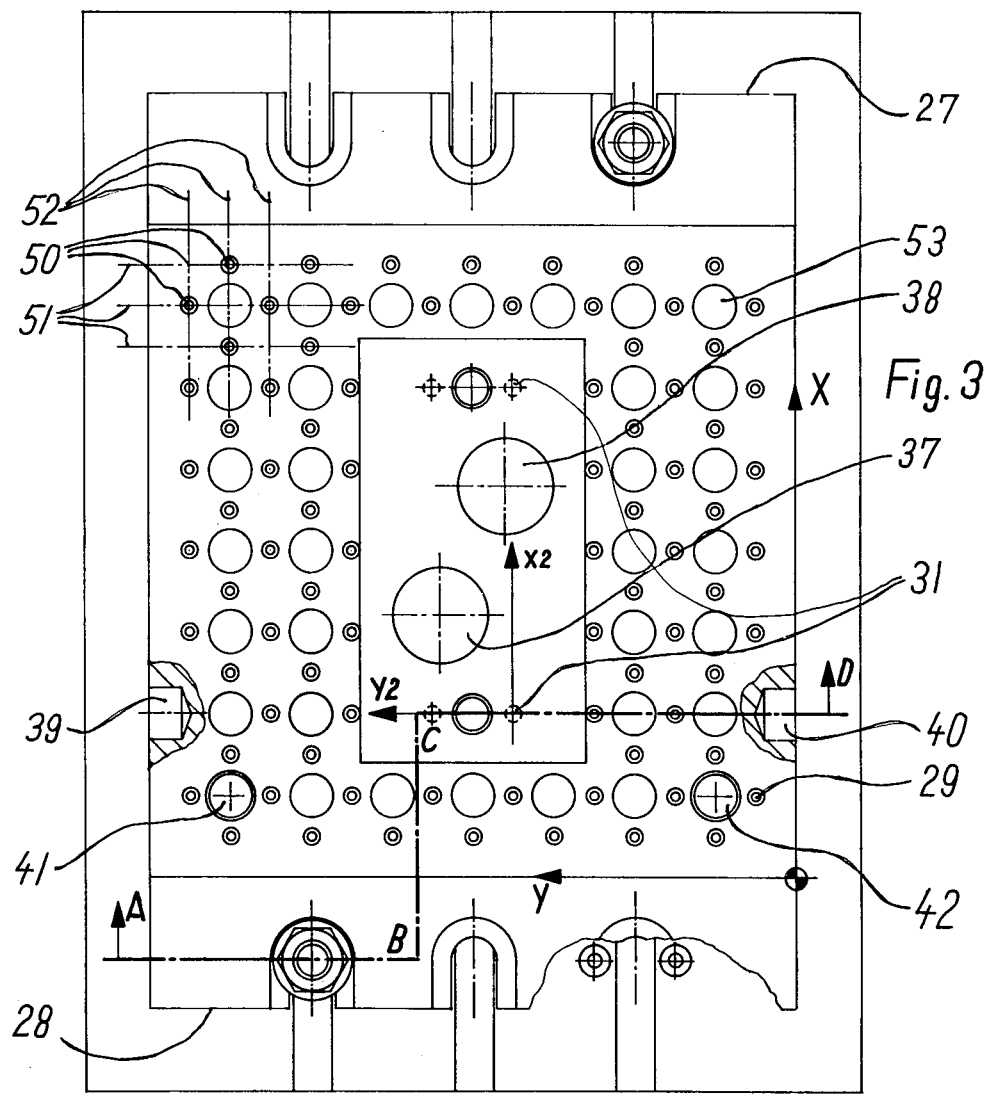

FIGS. 3 and 4 show a preferred form of construction of a clamping body. The clamping body 20 carries a workpiece 21 to be operated on and is fastened to a clamping support 22, which may for example be a clamping table or a part thereof of a machine tool. The clamping body 20 has a receiving surface 23 for the reception either of workpieces, which are to be finished when clamped on in this receiving position, or of components which are to have an auxiliary function during the clamping-up or finishing of other workpieces. Parallel to the receiving surface 23, the clamping body 20 has a combination surface 24, which serves for the setting-up and/or fastening of the clamping body in desired spatial positions.

Perpendicular to the receiving surface 23, the clamping body 20 has four lateral surfaces 25, 26, 27 and 28, by which the clamping body may be aligned and positioned on a suitable support, for example on a machine tool table. In this case, the surfaces 25, 26, 27 and 28 may be brought into contact with, for example, abutment bodies (not shown) already present on the support.

Furthermore, the clamping body is associated with a rectangular, three-dimensional reference co-ordinate system X, Y and Z, according to which, as a rule, the clamping body 20 is also aligned. The Z-axis preferably stands perpendicularly to the receiving surface 23 and the X-axis and Y-axis lie parallel to and at known spacings from the lateral surfaces 25, 26, 27 and 28.

Positioning recesses 29 are provided in the receiving surface 23 of the clamping body 20. With the aid of a suitable positioning element 30 together with positioning recesses 31 of the workpiece 21 (or with positioning recesses of a desired other component), such positioning means may be provided as are disclosed in said patent.

As many positioning recesses 29 as desired may be provided in the receiving surface 23 in any desired dimensional arrangement with respect to the reference co-ordinate system X, Y and Z. Preferably, the positioning recesses 29 are however so arranged in the receiving surface 23 that their centre points, which are the intersections of their centre lines with the plane of the receiving surface 23, lie in intersections 50 of two sets of straight lines 51 and 52 which are perpendicular to one another. The straight lines lie in the plane of the receiving surface 23 and have the same spacings from one another. A point raster generated by the intersections 50 of these sets of straight lines is hereinafter called a point raster of the first kind.

The point-to-point pitch spacings of the point raster of the first kind are preferably standard dimensions which represent an integral multiple of a basic measurement. The basic measurement, for example 1.25 millimeters, is identical with the basic measurement which is used for the generation of a similar point raster for the joint face of the workpiece or other kinds of components to be clamped onto the clamping body.

The raster lines of the point raster of the first kind lie parallel to and at known spacings from the co-ordinates of the reference co-ordinate system X, Y and Z of the clamping body 20. Therefore, the distances of the centre lines 32 of the positioning recesses 29 from the surfaces 25, 26, 27 and 28 are also known.

The workpiece 21 at its joint face 33 has positioning recesses 31, of which the centre points -defined by their centre lines- lie in a point raster of the first kind. Through the relative position of two of these positioning recesses, there is defined a reference co-ordinate system X2, Y2 and Z2, for the workpiece 21 and to which all dimensions of the workpiece 21 relate. In this manner, the workpiece 21 may be positioned, during the clamping-up onto the clamping body 20, in a predetermined relative position with respect to the reference co-ordinate system X, Y and Z thereof. In FIG. 4, the fastening of the workpiece 21 on the clamping body 20 is undertaken by a screw 35 introduced from below into a threaded bore 34. This means of fastening, which may be used only if the clamping body 20 is exchangeable palette, is only one of several possible means of fastening. Fastening may equally well occur by, for example, clamping brackets according to DIN 6315, onto the surface 36 of the workpiece 21. However, in this case, operations on the surface 36 itself as well as the production of bores 37 and 38 from this surface is obstructed.

Before the production, for example of the bores 37 and 38, of the workpiece 21 clamped onto the clamping body 20 on a machine tool, the centre of the working spindle of the machine tool must have a certain, known relative position to the X-axis and Y-axis of the reference co-ordinate system X, Y and Z of the clamping body 20. This relative position must be settable or checkable at any time. For this purpose, the clamping body 20 has reference bores 39, 40, 41 and 42 perpendicular to the co-ordinate planes of the reference co-ordinate system X, Y and Z, wherein the centre point of the reference bores is in a known, exact dimensional relationship to the reference co-ordinate system X, Y and Z of the clamping body 20 and also to the positioning recesses of the receiving surface 23. The centre lines of machine tool working spindles may be brought into congruency in known manner with the centre lines of these reference bores 39, 40, 41 and 42.

For alignment of the centre line of a machine tool spindle relative to the clamping body 20, the positioning recesses 29 present on the clamping body may also be used. In this case, the aforementioned alignment need not occur directly through the reference bores 39, 40, 41 and 42 or the positioning recesses 29, but they may serve to position a special member, with the aid of which the actual alignment takes place. In the case of the reference bores 39, 40, 41 and 42, this may for example be a simple bolt which is encircled by a sensing lever of a mechanical measuring clock mounted on a machine tool spindle, whereby the deviation of the centre lines of bolt and machine tool spindle may be measured.

The fastening of the clamping body 20 on a suitable clamping support 22 may be effected in a known manner. For this purpose, T-groove screws 44 may be provided, which are introduced into T-grooves 43 of the clamping support 22 and which are guided through clamping slots 45 of the clamping body 20 and the clamping body 20 by way of hexagon nuts 46.

It has already been stated that the lateral surfaces 25, 26, 27 and 28 of the clamping body 20 are suitable for the aligning and positioning of the clamping body on a clamping support 22, for example with the aid of abutment bodies (not shown).

The same principle, as is used for the positioning of the workpiece 21 on the receiving surface 23 of the clamping body 20, may also be used for the alignment and simultaneous positioning of the clamping body 20 on another clamping support. For this purpose, the clamping body at its combination surface 24 has positioning recesses 47, which by way of suitable positioning elements 48 correspond with positioning recesses 49 of the clamping support 22 and form positioning means as disclosed in said patent.

Preferably, the centre points of the positioning recesses 47 -defined by their centre lines- of the combination surface 24, are arranged in a point raster of a second kind similar to the arrangement of the positioning recesses 29 on the receiving surface 23 of the clamping body 20. The point-to-point i.e., pitch spacings of the point raster of the second kind preferably represent an integral multiple of the point-to-point spacing of the point raster of the first kind. If the combination surface 24 is parallel to the receiving surface 23 and with respect to its X and Y co-ordinates, the points of the point raster of the second kind co-incide with some of the points of the point raster of the first kind. It results from this that the point raster of the second kind has a known dimensional association with the reference co-ordinate system X, Y and Z of the clamping body 20. To position the positioning recesses 49 in the clamping support 22, they should also be arranged in a second point raster of a second kind.

The clamping body 20 furthermore has bores 53 which may serve to accommodate means for fastening workpieces or other components on the clamping body as well as the clamping body itself to another carrier part. In using the bores 53 to fasten workpieces or other components to the receiving surface 23 of the clamping body 20, one may, apart from the manner already described in relation to FIG. 4, introduce fastening screws into the clamping body 20 from the receiving surface 23. For this purpose, the bores 53 themselves may be wholly or partially provided with threads or each fastening screw may be brought into engagement with a nut-like member (not shown) which may be, for example, slotted according to DIN 546 and accommodated in the enlarged part 54 of the bore 53. Preferably, the centres of the bores 53 are arranged in a point raster of a third kind, in which case, the point-to-point i.e. pitch spacings preferably represent an integral multiple of the point-to-point spacing of the point raster of the first kind. The points of the point raster of the third kind preferably co-incide with points of the point raster of the first kind.

Only one receiving surface 23 is provided for the clamping body shown in the FIGS. 3 and 4. In other embodiments, the clamping bodies can, however, have several receiving surfaces. Up to five receiving surfaces may be provided, for example, in the case of parallelopipedonal bodies. In such a case, the four receiving surfaces arranged perpendicularly to the combination surface may by means of abutment serve as surfaces for alignment, as this is possible in the case of the clamping body 20 by means of the surfaces 25, 26, 27 and 28.

Several receiving surfaces may be arranged at desired spatial angles to one another. Furthermore, in the case of the clamping body 20 shown in the FIGS. 3 and 4, a combination surface 24 is provided for the setting-up and/or fastening of the clamping body and is arranged parallel to the receiving surface 23. In a further (not shown) embodiment, the combination surface is also arranged at a desired spatial angle to a receiving surface, for example at an angle of 90 degrees in the case of an angular clamping body. In this case, bores may be arranged perpendicularly to the combination surface similarly to the bores 53 in FIG. 4. In a further embodiment, the clamping body 20 can also be constructed as a fixed clamping cheek of a vice. In this case, the bores 53 may be dispensed with, since the clamping of the workpiece 21 onto the receiving surface 23 takes place in such a way that the movable clamping cheek of the vice exerts a contact pressure onto the surface 26 of the workpiece 21.

In the embodiment of the clamping body shown in the FIGS. 3 and 4, point rasters, the raster points of which lie on raster lines, which are aligned parallel to a rectangular reference co-ordinate system of the clamping body, are defined for the positioning recesses 29 and 47, and for the bores 53 in the receiving surface 23. In place of these point rasters, point rasters associated with a polar co-ordinate system may be provided. In this case, the raster points lie on circles, which have their centre point in the centre point of the polar co-ordinate system and on radii which eminate from the centre point of the polar co-ordinate system and which are displaced relative to one another by a certain constant angle.

In FIGS. 3 and 4, the clamping body 20 carries a workpiece 21 to be operated on. In place of such a workpiece, the receiving body may receive any desired other component which is used in the actual production of a workpiece and which for this purpose must be brought into a predeterminable position relative to the clamping body. Workpieces to be finished in other components with auxiliary functions may also be clamped onto the clamping body simultaneously in any desired manner. In this case, the clamped-up other components with auxiliary functions may be clamping bodies which are smaller than the clamping body 20 and which are provided with the same features as was described above in relation to FIGS. 3 and 4 for the clamping body 20.

Figure 5:
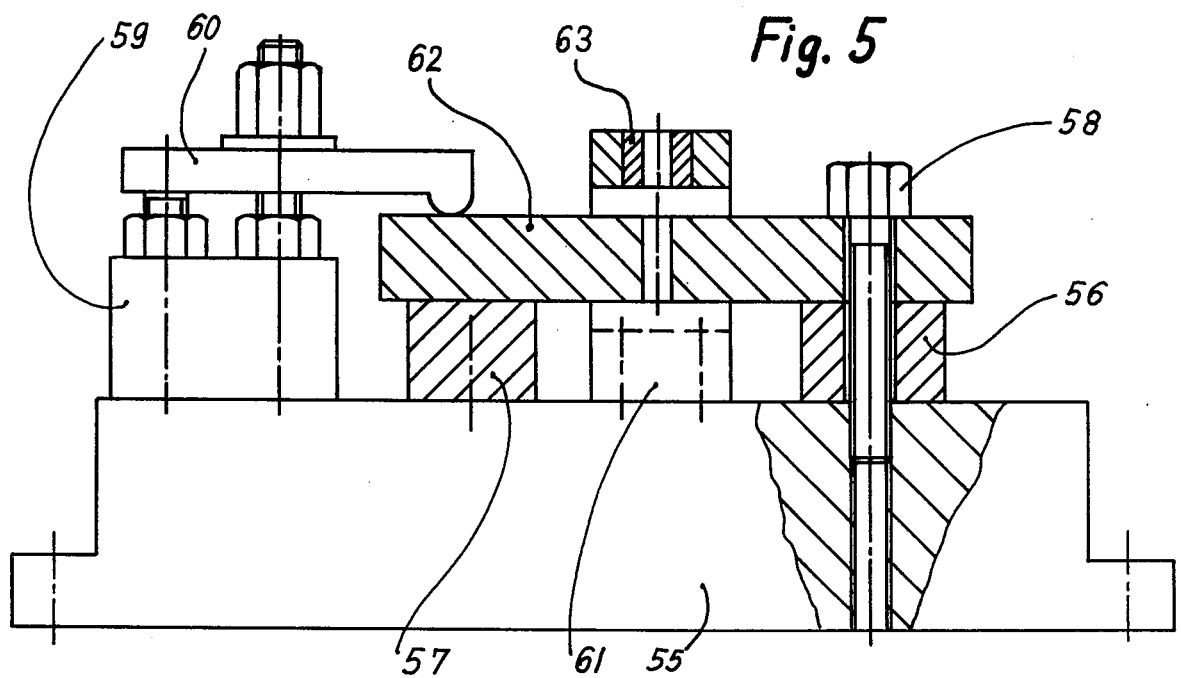
FIG. 5 shows a large clamping body with smaller clamping bodies, a workpiece and two smaller components clamped-on, FIG. 6 shows a partial view of the clamping body shown in FIGS. 3 and 4 with further clamping bodies and the workpiece shown in FIGS. 1 and 2.

Such an example is shown in FIG. 5. Clamped onto a larger clamping body 55 are two smaller clamping bodies 56 and 57, which in their turn carry a workpiece 62. Two further clamped-up components 59 and 61 likewise have auxiliary functions. The component 59 serves for the fastening of a clamping bar 60, while the component 61 carries a drill-jig bush 63. The clamping-up of the workpiece 62 takes place by means of a screw 58 and by means of the clamping bar 60.

The clamped-up components 59 and 61 and clamping bodies 56 and 57 may be brought into a predetermined position relative to the clamping body 55 with the aid of positioning means disclosed in the said patent. The smaller clamping bodies 56 and 57 have positioning recesses on their respective sides facing the workpiece 62, the centre lines of which are at a known spacing from the centre lines of the positioning recesses on the underside. Since the workpiece 62 was brought into a predeterminable position relative to the smaller clamping bodies 56 and 57 with the aid of appropriate positioning means, it is also in a predeterminable position relative to the larger clamping body 55.

In the manner described in relation to FIG. 5, complete production jigs may be assembled in a very short time with standard and/or individual clampable components for auxiliary functions, wherein the clampable components for auxiliary functions as well as the actual workpieces can be brought into a predeterminable position relative to the common (larger) clamping body with the use of positioning means disclosed in the said patent. The common (larger) clamping body may in this case function as an exchangeable palette, on which one may clamp the components or workpieces away from the operating machine in order, during this activity, not to have to let the machine remain idle.

The common (larger) clamping body 55 may, instead of being a transportable palette, be a locally fixed machine tool table which may have all the features of the clamping body 20 of FIGS. 3 and 4.

The manner of clamping shown in FIGS. 3 and 4 for the workpiece 21 is not suitable for all kinds of production and for all workpieces. Thus, for example, operation on the lateral surfaces of the workpiece 21 perpendicular to the receiving surface 23 of the clamping body 20 is obstructed.

Likewise, the bores 37 and 38 cannot be made to extend right through the workpiece since no overrun path is provided for the drilling tools on their exit from the joint face 33. Moreover, the positioning recesses 31 of the workpiece 21 must lie in the point raster of the first kind of the receiving surface 23, which would means too great a constructional restriction for many operations.

These disadvantages are avoided by the use of a further manner of construction of a clamping body as shown in the FIGS. 6, 7, 8 and 10.

Shown in FIG. 6 is a partial elevation of the clamping body 20 of FIGS. 3 and 4 with a co-ordinate origin 64 of the reference co-ordinate system X, Y and Z. Arranged on the receiving surface 23 of the clamping body 20 are two smaller clamping bodies 65 and 66, on which in turn is clamped the workpiece 1, (shown in FIGS. 1 and 2) which is to be finished.

FIG. 7 shows a section EF through the arrangement according to FIG. 6. The clamping body 65 carries (as does the partially illustrated clamping body 66) reference bores 67, 68, 69 and 70, according to which, for example, the centre line of a machine tool spindle may be aligned.

The clamping of the workpiece 1 onto the clamping bodies 65 and 66 is effected in the arrangement shown in the FIGS. 6 and 7 with the aid of two screws 71 and 72, which are guided through passage bores 73 arranged in the clamping bodies before they are brought into engagement with nut-shaped members 74. Centre points 75 and 76 of the passage bores 73 represent reference points in relation to the positioning of the clamped-up workpiece 1.

Figure 10:
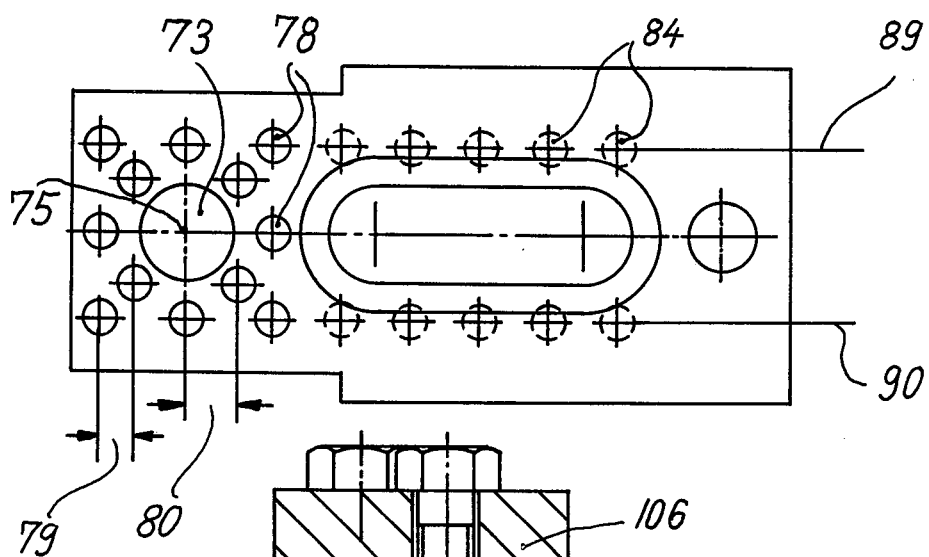
FIG. 10 shows a plan view of a further clamping body shown in FIG. 6.
Figure 11:
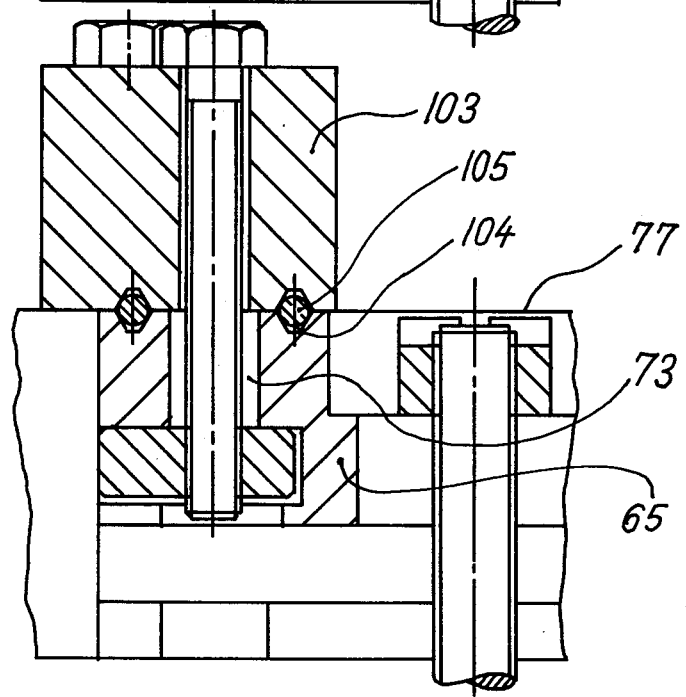
FIG. 11 shows a modification of a section along lines E F of FIG. 6.

FIG. 10 shows a plan view of a receiving surface 77 of the clamping body 65. Positioning recesses 78 intended for the positioning of the workpieces are arranged symmetrically of the centre point 75. The centre points of all the positioning recesses 78 however, together with the centre point 75 lie in a point raster of the first kind as was defined for the positioning recesses of the receiving surface 23 of the clamping body 20. However, in this case, spacings 79 and 80 between parallel raster lines may be smaller, but, they likewise represent integral multiples of a basic dimension of, for example, 1.25 millimeters. The centre points of the positioning recesses arranged in the workpiece 1 to be clamped up must lie in a point raster which corresponds to the point raster of the receiving surface 77 of the clamping body 65.

A screw connection is the manner of fastening most frequently used for the connection of two components. As a rule, at least two screws are provided for each component to be fastened. In the use of positioning means similar to those disclosed in the said patent, it is preferable to arrange the positioning recesses in the immediate proximity of the passage holes or threaded bores for the fastening screws. The centre point of the passage bore or of the threaded bore preferably always represents a reference point for the arrangement of the positioning recesses. If at all possible, the co-ordinate dimensions of the spacings of the centre points of the fastening screws (referred to a reference co-ordinate system internally of a workpiece) should represent an integral multiple of the basic dimension of, for example, 1.25 millimeters in common with the point raster of the first kind. This is for example the assumed case in the spacings 81 and 82 of the workpiece 1 in FIG. 6.

The clamping bodies 65 and 66 may be brought into predeterminable positions on the (larger) clamping body 20 with the aid of positioning recesses 84 (FIG. 8) accommodated on their combination surface 83. It must be ensured in this case that the centre points 75 and 76 of the passage bores 73 are in the desired, predeterminable co-ordinate spacings 81 and 82. It is necessary for this purpose that the clamping body 65 at least in the Y-direction and clamping body 66 at least in the X-directionn are positionable in predeterminable positions which are spaced from one another by the basic dimension (for example 1.25 millimeters) of the point raster of the first kind. This is attained by a special arrangement of the positioning recesses in the clamping bodies 20, 65 and 66.

Figure 8:
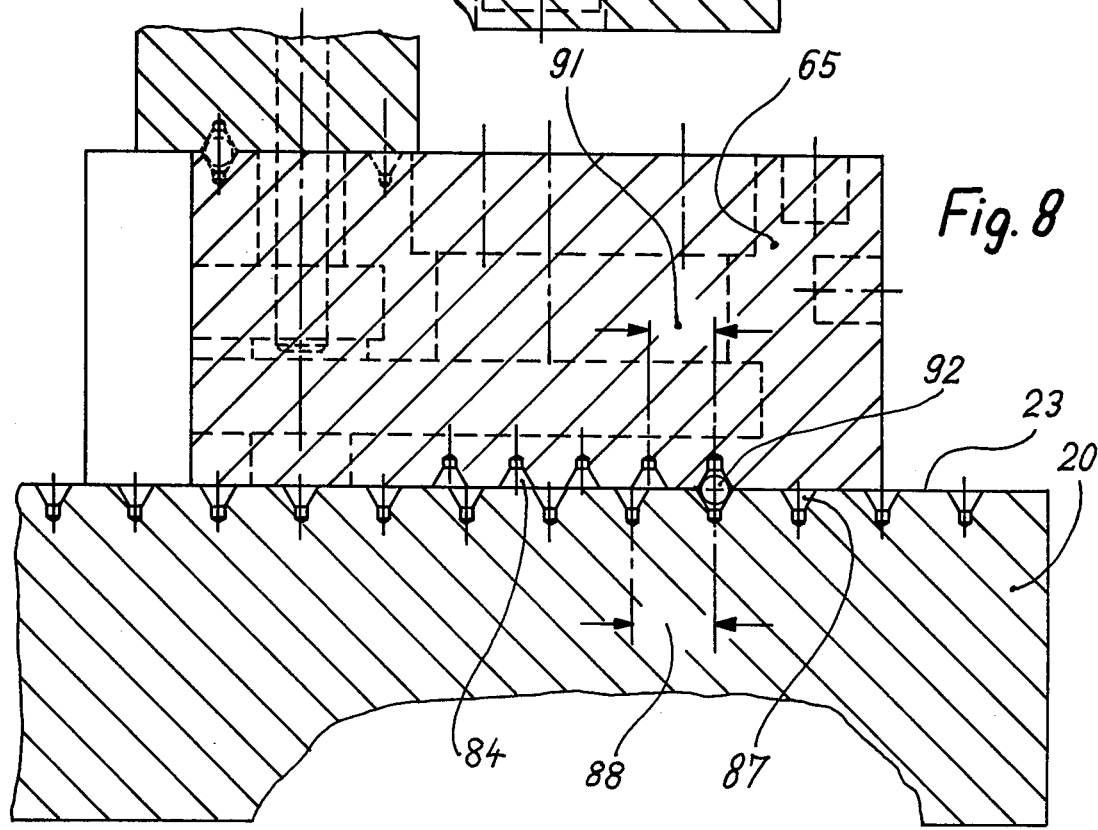
FIG. 8 shows a section along lines G H of FIG. 6.

FIG. 8 shows a section G-H through the arrangement shown in FIG. 6. Positioning recesses 87, which have a spacing 88 from one another (FIG. 8) are arranged in at least two lines 85 and 86 (FIG. 6) parallel to the Y-axis of the reference co-ordinate system X, Y and Z in the receiving surface 23 of the clamping body 20. Positioning recesses 84, which have a spacing 91 from one another (FIG. 8), are arranged in two lines 89 and 90

(FIG. 10), which have the same spacing from one another as the lines 85 and 86, in the combination surface 83 of the clamping body 65.

The spacings 88 and 91 differ by the measurement of the basic dimension (for example 1.25 millimeters) of the point raster of the first kind.

By appropriate combination of a positioning recess 84 and a positioning recess 87, the clamping body 65 may be positioned relative to the clamping body 20 in steps of the basic dimension (for example 1.25 millimeters) with the aid of a common positioning element 92 in the lines 85, 86 and 89, 90. In the same manner, the clamping body 66 can be positioned in X-direction in raster spacings of the basic dimension.

The possibility indicated here of the positioning in a very fine raster is not restricted to only the clamping bodies 65 and 66, but may be applied equally well to other components to be clamped-up which must be positioned in fine steps relative to another carrier component. This applies for example to the components 59 and 61 in FIG. 5.

The positoning of the workpiece 1 relative to the two clamping bodies 65 and 66 takes place with the aid of positioning recesses 93 in the workpiece 1, positioning recesses 78 in the clamping bodies 65 and 66 and positioning elements 94.

Figure 9:
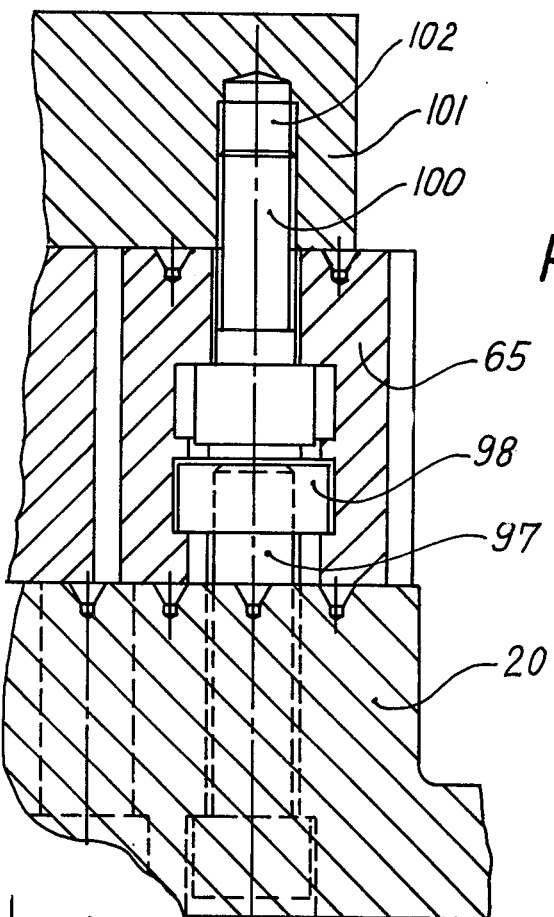
FIG. 9 shows a modification of a section along lines K L of FIG. 7.

The fastening of the (smaller) clamping bodies 65 and 66 to the (larger) clamping body 20 is effected by screw 95 and a nut 96 and/or a screw 97, which engages in an internally threaded grooved block 98 (FIG. 9). Fastening in any possible position is ensured by the presence of grooves 109 or 110 (FIG. 7), the usable longitudinal extent of which is greater than the spacing 99 of the passage holes 53. Clamping of the clamping body 65 onto the clamping body 20 is not, however, restricted to the illustrated method of fastening by means of screws.

The method of fastening, shown in the FIGS. 6 and 7 of the workpiece 1 to the receiving surface 77 of the clamping body 65 is only one of several possible methods.

FIG. 9 shows a modification of a section K-L through the arrangement shown in FIG. 7 and comprises a workpiece 101 in which a blind threaded hole 102 extends from the joint face and a fastening screw 100. The manner of fastening shown in FIG. 9 has the advantage that there is less obstruction to multi-sided operations on the workpiece 101 in one and the same clamping condition. Fastening of the workpiece 1 on the clamping body 65 is however also possible with other known means, such as for example with the aid of clamping bars 60 (FIG. 5).

In FIGS. 1 to 10, positioning means disclosed in the said patent are used which include a full sphere as the positioning element. However, any of the positioning means disclosed in the said patent may be used. Particularly useful are positioning means in which the positioning element is a torus or a sphere with a central passage bore.

As FIGS. 11 and 12 show, only slight changes need in this case be carried out on the clamping bodies.

FIG. 11 shows a modification of a section K-L through the arrangement shown in FIG. 7 and comprises a workpiece 103, a positioning recess 104 and a positioning element 105. The positioning recess 104 in the receiving surface 77 of the clamping body 65 and the opposite positioning recess in the workpiece 103 are a circularly shaped groove of trapezoidal cross-section, while the positioning element 105 is a torus of circular cross-section.

FIG. 12 shows a further modification of a section K-L through the arrangement shown in FIG. 7 and comprises a workpiece 106, a positioning recess 107 and a positioning element 108. The positioning recess 107 in the receiving surface 77 of the clamping body 65 and the opposite positioning recess in the workpiece 106 is a conical bore, while the positioning element 108 is a sphere with a central passage bore.

In the arrangements shown in FIGS. 11 and 12, the centre line of the positioning means can co-incides with the centre line of the passage bore 73 serving to accommodate the fastening means.

I claim:

1. A clamping body for use in the performance of an operation on a workpiece and comprising:
   (a) a receiving surface to receive a workpiece,
   (b) at least two special positioning recesses at said receiving surface of said clamping body, said special positioning recesses each having a cross-section which narrows in a direction away from said receiving surface and being adapted to receive a positioning element for the use of positioning said workpiece free of play, and
   (c) reference means disposed at a precise predetermined position relative to a three-dimensional rectangular reference coordinate system defined by said at least two special positioning recesses in the plane of said receiving surface and being detectable by measurement means even if the whole of said receiving surface is covered by said workpiece, wherein at least one precise measure of said predetermined position extending in parallel with one axis of said rectangular reference co-ordinate system is derivable from said reference means.

2. A clamping body provided with a workpiece for use in the performance of an operation on said workpiece and comprising:
   (a) a receiving surface to receive a workpiece,
   (b) positioning means comprising at least two special positioning recesses at at least said receiving surface of said clamping body, and
   (c) reference means disposed at a predetermined position relative to a three-dimensional rectangular reference co-ordinate system defined by said at least two special positioning recesses in the plane of said receiving surface and being detectable by measurement means, wherein at least one measure of said predetermined position extending parallel with one axis of said rectangular reference co-ordinate system is derivable from said reference means, and wherein each of said at least two special positioning recesses has a substantially conical wall surface portion disposed symmetrically with respect to an axis of symmetry extending substantially perpendicularly of said receiving surface and passing through said special positioning recess, said workpiece being provided with a positioning element having a free end portion thereof extending outwardly from a bearing surface of said workpiece and adapted to be introduced into said special positioning recess in said clamping body, said free end portion of said positioning element having a substantially spherical centering portion of reducing cross-section towards an outer extremity of said free end portion and having an axis of symmetry alignable with said first mentioned axis of symmetry, whereby—on said clamping body and said workpiece being urged towards one another to cause said positioning element to enter said special positioning recess in said clamping body—said receiving surface of said clamping body and said bearing surface of said workpiece are brought into mutually abutting relationship to define an interface between said clamping body and said workpiece whilst only said substantially spherical centering portion of said positioning element is brought to engage against said substantially conical wall surface portion of said spherical positioning recess, said substantially conical wall surface portion being tapered to include at said axis an angle smaller than that subtended thereat by any two notional tangents to said substantially spherical centering portion at points thereon disposed symmetrically relative to said axis and inwardly of said engaging surfaces, said conical wall surface portion extending outwardly from said engaging surfaces to be spaced apart from the surface portion of said positioning element facing said conical wall surface portion, said substantially spherical centering portion being brought to engage with sufficient force to cause material deformation of at least one of said substantially conical wall surface portion and said substantially spherical centering portion thereby to enlarge at least one of said surfaces and to positively locate said positioning element in said special positioning recess free of play.

3. A clamping body provided with a workpiece for use in the performance of an operation on said workpiece and comprising:
   (a) a receiving surface to receive a workpiece,
   (b) positioning means comprising at least two special positioning recesses at at least said receiving surface of said clamping body, and
   (c) reference means disposed at a predetermined position relative to a three-dimensional rectangular co-ordinate system defined by said at least two special positioning recesses in the plane of said receiving surface and being detectable by measurement means, wherein at least one measure of said predetermined position extending in parallel with one axis of said rectangular reference co-ordinate system is derivable from said reference means, and wherein said workpiece has a bearing surface and is provided with positioning means at at least said bearing surface, said positioning means comprising further recesses each having a substantially conical wall surface portion disposed symmetrically with respect to an axis of symmetry extending substantially perpendicularly of said bearing surface and passing through said further recess, said substantially conical wall surface portion being of increasing cross-section towards said bearing surface, said clamping body being provided with a positioning element located in said special positioning recess and having a free end portion thereof extending outwardly from said receiving surface of said clamping body and adapted to be introduced into said further recess in said workpiece, said free end portion of said positioning element having a substantially spherical centering portion of reducing cross-section towards an outer extremity of said free end portion and having an axis of symmetry alignable with said first mentioned axis of symmetry, whereby on said clamping body and said workpiece being urged towards one another to cause said positioning element to enter said further recess in said workpiece, said receiving surface of said clamping body and said bearing surface of said workpiece are brought into mutually abutting relationship to define an interface between said receiving surface and said bearing surface whilst only said substantially spherical centering portion of said positioning element is brought to engage against said substantially conical wall surface portion of said further recess, said substantially conical wall surface portion being tapered to include at said axis an angle smaller than that subtended thereat by any two notional tangents to said substantially spherical centering portion at points thereon disposed symmetrically relative to said axis and inwardly of said engaging surface, said conical wall surface portion extending outwardly from said engaging surfaces to be spaced apart from the surface portion of said positioning element facing said conical wall surface portion, said substantially spherical centering portion being brought to engage with sufficient force to cause material deformation of at least one of said substantially conical wall surface portions and said substantially spherical centering portion thereby to enlarge at least one of said engaging surfaces and to positively locate said positioning element in said further recess free of play.

4. A clamping body as defined in claim 1, wherein said reference means comprises at least one surface parallel with and of defined spatial position relative to a plane defined by two axes of said rectangular co-ordinate system.

5. A clamping body as defined in claim 1, wherein said reference means comprises at least one bore parallel with and of defined distance from an axis of said rectangular reference co-ordinate system.

6. A clamping body as defined in claim 1, comprising at least five planar surfaces, at least one of said planar surfaces being said receiving surface and at least one of said planar surfaces being a combination surface by which said clamping body is clampable to a further body and which is at a defined spatial position relative to said rectangular reference co-ordinate system.

7. A clamping body as defined in claim 6, wherein said combination surface is parallel to said receiving surface.

8. A clamping body as defined in claim 6, wherein said combination surface is perpendicular to said receiving surface.

9. A clamping body as defined in claim 6, comprising orienting means, by means of which said rectangular reference co-ordinate system is orientable relative to said further body.

10. A clamping body as defined in claim 9, wherein said orienting means comprises at least one surface of defined spatial position relative to said rectangular reference co-ordinate system.

11. A clamping body as defined in claim 9, wherein said orienting means comprise at least two of said special positioning recesses disposed in said combination surface.

12. A clamping body as defined in claim 1, wherein said positioning means at at least said receiving surface comprises rows of spaced said special positioning recesses, adjacent pairs of said special positioning recesses having the same pitch spacing from each other in two mutually perpendicular directions and constituting an array of said special positioning recesses having a first pitch spacing between said adjacent pairs of said special positioning recesses.

13. A clamping body as defined in claim 6, provided with further positioning means at at least said combination surface, said further positioning means comprising spaced said special positioning recesses disposed in rows, adjacent pairs of said further special positioning recesses having the same pitch spacing from each other in two mutually perpendicular directions, and constituting an array of said further special positioning recesses having a second pitch spacing between said adjacent pairs of further special positioning recesses.

14. A clamping body as defined in claim 6, further comprising bores for the reception of fastening means to fasten said clamping body to said further body and extending perpendicular to at least one of said combination surface and said receiving surface.

15. A clamping body as defined in claim 14, wherein said bores are disposed in rows, adjacent pairs of said bores having centre lines which have the same pitch spacing from each other in two mutually perpendicular directions and constituting an array having a third pitch spacing between said adjacent centre lines of said bores.

16. A clamping body as defined in claim 15, wherein said third pitch spacing is an integral multiple of said first pitch spacing and some of said special positioning recesses are in alignment with said centre lines of said bores.

17. A clamping body as defined in claim 6, provided with still further positioning means at at least said combination surface, said still further positioning means comprising rows of still further spaced special positioning recesses adjacent still further special positioning recesses in one direction being spaced from one another by a distance which is an integral multiple of said first pitch spacing and adjacent still further special positioning recesses in a direction perpendicular to said one direction being so spaced from one another by a distance which differs from said first pitch spacing that said first pitch spacing is an integral multiple of said difference.

18. A clamping body as defined in claim 14, wherein said bores are each provided with a frusto-conical portion opening at said receiving surface and constituting a recess for the reception of a spherical positioning element provided with a central bore for said fastening means.

19. A clamping body as defined in claim 1, further comprising at least one other clamping body which is smaller than said clamping body, said at least one other clamping body being clampable to said clamping body and having a receiving surface to which a workpiece is clampable.

20. A clamping body as defined in claim 1, wherein said clamping body comprises a machine-tool table part.

* * * * *